United States Patent
Lee et al.

(10) Patent No.: US 7,339,017 B2
(45) Date of Patent: Mar. 4, 2008

(54) ACRYL-MODIFIED POLYESTER RESIN COMPOSITION AND METHOD OF PREPARING THE SAME

(75) Inventors: Ju-Kil Lee, Sungnam (KR); Deok-Min Park, Anyang (KR)

(73) Assignee: DPI Co., Ltd. (KR)

( * ) Notice: Subject to any disclaimer, the term of this patent is extended or adjusted under 35 U.S.C. 154(b) by 213 days.

(21) Appl. No.: 10/748,577

(22) Filed: Dec. 30, 2003

(65) Prior Publication Data

US 2004/0152856 A1     Aug. 5, 2004

(30) Foreign Application Priority Data

Dec. 30, 2002    (KR)    ....................... 10-2002-0087024

(51) Int. Cl.
*C08F 222/10*    (2006.01)
*B05D 7/16*    (2006.01)

(52) U.S. Cl. .................................. 526/325; 427/412.5

(58) Field of Classification Search ................ 526/325; 427/412.5

See application file for complete search history.

(56) References Cited

U.S. PATENT DOCUMENTS

| | | | | |
|---|---|---|---|---|
| 3,061,459 A | * | 10/1962 | Bader | 427/409 |
| 3,219,473 A | * | 11/1965 | Dimond | 427/359 |
| 3,655,820 A | * | 4/1972 | Kaupp | 528/306 |
| 4,294,751 A | * | 10/1981 | Gardner | 523/513 |
| 4,751,267 A | * | 6/1988 | Berghoff | 525/108 |
| 5,274,052 A | * | 12/1993 | Nozaki et al. | 525/444 |
| 5,281,630 A | * | 1/1994 | Salsman | 521/48.5 |
| 5,326,821 A | * | 7/1994 | Sasaki et al. | 525/124 |
| 6,576,717 B1 | * | 6/2003 | Kuo | 525/445 |
| 2004/0044117 A1 | * | 3/2004 | Kiefer-Liptak et al. | 524/523 |

FOREIGN PATENT DOCUMENTS

| | | | |
|---|---|---|---|
| JP | 63309533 A | * | 12/1988 |
| JP | 08196991 | | 8/1996 |
| JP | 09241582 | | 9/1997 |
| JP | 2000108286 A | * | 4/2000 |

OTHER PUBLICATIONS

JPO Abstract of JP 63309533 A, Sadami Miura et al., "Flat, Easily Slidable Polyester Film", Dec. 16, 1988.*
JPO Abstract of JP 2000108286 A, Shinji Yano et al; "Antistatic, Easily Adhesive Polyester Film", Apr. 18, 2000.*

* cited by examiner

*Primary Examiner*—Randy Gulakowski
*Assistant Examiner*—John J. Figueroa
(74) *Attorney, Agent, or Firm*—Cantor Colburn LLP

(57) ABSTRACT

A condensation polymerization of apolyhydric alcohol and a polybasic acid in a solvent is performed to give a polyester resin. The polyester resin and an unsaturated polybasic acid are polymerized to give a polyester resin intermediate of following formula (1) having a carbon-carbon double bond at one end. The polyester resin intermediate is polymerized with an acryl monomer to give an acryl-modified polyester resin composition. Due to the polymerization of the polyester resin intermediate having the carbon-carbon double bond and the acryl monomer, a paint including the acryl-modified polyester resin composition has advantages of a polyester resin and the acryl resin, $$R-CH_2-O-CO-CH=CH-X \qquad (1)$$

wherein R represents a polyester polymer residue, and X represents a methyl or carboxylic group.

10 Claims, No Drawings

ACRYL-MODIFIED POLYESTER RESIN COMPOSITION AND METHOD OF PREPARING THE SAME

CROSS REFERENCE TO RELATED APPLICATION

This application claims priority under 35 USC §119 to Korean Patent Application No. 2002-87024, filed on Dec. 30, 2002, the contents of which are incorporated herein by reference in their entirety.

BACKGROUND OF THE INVENTION

1. Field of the Invention

This invention relates to an acryl-modified polyester resin composition and a method of preparing the acryl-modified polyester resin composition. More particularly, this invention relates to an acryl-modified polyester resin composition of paints for coating a pre-coated metal (PCM) steel sheet used for home appliances and a method of preparing the acryl-modified polyester resin composition.

2. Description of the Related Art

Paints for coating a PCM steel sheet require excellent mechanical properties, chemical properties and working efficiency. The mechanical properties include processibility that represents flexibility of a film after coating, pencil hardness that indicates hardness of a coated surface, adhesiveness between the undercoat film and a substrate or topcoat film, or friction resistance. The chemical properties include an acid resistance, alkali resistance, solvent resistance or weather resistance. The working efficiency includes an operation property that determines product yields and costs according to an operating speed.

Generally, the paints for coating the PCM steel sheet include acryl based, urethane based, epoxy based, polyester based, silicon based, fluorine based and polyvinylchloride based resins or combined resins thereof. Most paints including the resins are thermosetting paints and mixtures with a curing agent.

Japanese Patent Laid-Open Publication Nos. 1996-196991 and 1997-241582 disclose paint compositions with excellent processibility. The paint compositions include a polyethylene terephthalate (PET) resin or acryl resin as a main element, and a melamine or urethane cross-linking agent for improving film hardness. However, the PET resin has poor compatibility with a solvent or a variety of additives. Thus, the PET resin does not provide uniform film appearance and also has poor processibility for home appliances.

Therefore, the polyester based, epoxy based and urethane-modified polyester based resins have been widely used in coating paints except for the paints requiring specific properties. In particular, the polyester based resin is the most commonly used for its excellent mechanical property and operation property during the coating process.

The paints for coating the PCM steel sheet using the polyester resin have been applied on a corrosion resistant alloy steel sheet such as a molten zinc electroplating steel sheet, galbanum steel sheet, aluminum steel sheet or cold zinc steel sheet. The paints have been used for exterior finishing materials for building and industry, and materials for home appliances engineering. The paint including the polyester based resin for the exterior finishing materials has weak durability to repetitive natural conditions such as ultra violet ray, acid rain, sulfurous acid gas, wetness or dryness.

The paint for coating the PCM steel sheet for home appliances requires excellent processibility and hardness. Generally, the paint for coating the PCM steel sheet for home appliances includes a polyester resin as a main element, a melamine resin or isocyanate as a cross-linking agent, and a small quantity of additives such as a curing catalyst, anti-foaming agent or leveling agent. The paint includes a linear polyester resin having a low glass transition temperature (Tg) in order to improve processibility, and to reduce cracks after the application on the steel sheet. The linear polyester resin has a lower hydroxyl value and higher molecular weight than the polyester resin for the PCM steel sheet for construction materials. Thus, the linear polyester resin has low compatibility with a solvent. The linear polyester resin gives excellent processibility for the coated film, but has poor hardness. Thus, during processing or conveying of the steel sheet, film surface is impaired from contacts of the steel sheets or manual operation by an operator.

Moreover, due to low compatibility, the paint including the linear polyester resin is changed to a suspension while storing. Additionally, layer dissociation between the solvent and the resin occurs during the wintertime. Also, a precipitation is generated. Therefore, when the linear polyester resin is formulated to paint, pigments in the paint precipitate, and a storage property of the paint is impaired. Moreover, gloss and distinctiveness of image after coating are damaged to give a coarse surface.

SUMMARY OF THE INVENTION

It is a feature of the invention to provide an acryl-modified polyester resin composition used for a chemically and physically stable paint composition.

It is another feature of the invention to provide a method of producing an acryl-modified polyester resin composition used for a chemically and physically stable paint composition.

In accordance with one aspect of the invention, the acryl-modified polyester resin composition is produced by a polymerization of a polyester resin intermediate of formula (1) and an acryl monomer:

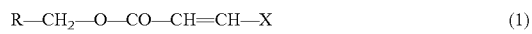

R—CH$_2$—O—CO—CH=CH—X (1)

wherein R represents a polyester polymer residue, and X represents a methyl or carboxylic group.

In accordance with another aspect of the invention, a polyhydric alcohol and polybasic acid are condensed in a solvent to give a polyester resin. The polyester resin and an unsaturated polybasic acid are polymerized to give a polyester resin intermediate of formula (1) having a carbon-carbon double bond at one end:

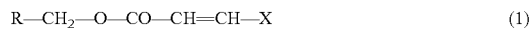

R—CH$_2$—O—CO—CH=CH—X (1)

wherein R represents a polyester polymer residue, and X represents a methyl or carboxylic group.

The polyester resin intermediate and an acryl monomer are polymerized to give the acryl-modified polyester resin composition.

The polyester resin intermediate having the carbon-carbon double bond is polymerized with the acryl monomer. The paint has both properties of the polyester resin such as adherence, solvent resistance, gloss, flexibility or impact resistance, and properties of the acryl such as a weather resistance, drying property, chemical resistance, hardness or solvent compatibility. The acryl-modified polyester resin is used for paints for upper coating the PCM steel sheet of home appliances.

DETAILED DESCRIPTION OF THE INVENTION

An acryl-modified polyester resin composition according to the invention will be described in detail. The acryl-modified polyester resin composition is produced by a polymerization of a polymer resin intermediate of formula (1) and an acryl monomer:

$$R-CH_2-O-CO-CH=CH-X \quad (1)$$

wherein R represents a polyester polymer residue, and X represents a methyl or carboxylic group.

When the average molecular weight of the polyester resin intermediate is less than about 1500, adherence, impact resistance or flexibility of the acryl-modified polyester resin composition deteriorates, which is unpreferable. When the average molecular weight of the polyester resin intermediate is more than about 15000, the viscosity of the acryl-modified polyester resin composition excessively increases, thereby damaging the operating property, which is unpreferable. Thus, the acryl-modified polyester resin becomes improper for applying to subsequent processes. Therefore, the polyester resin intermediate preferably has the average molecular weight of about 1500 to 15000.

When the acid value of the polyester resin intermediate is less than about 3 mgKOH/g, the modification ratio of the acryl monomer is lowered to damage the final appearance of the acryl-modified polyester resin composition, which is unpreferable. When the acid value of the polyester resin intermediate is more than about 30 mgKOH/g, the water resistance or chemical resistance of the acryl-modified polyester resin composition may be damaged, which is unpreferable. Hence, the polyester resin intermediate has the acid value of about 3 to 30 mgKOH/g.

When the hydroxyl value of the polyester resin intermediate is less than about 1 mgKOH/g, the film hardness of the paint including the acryl-modified polyester resin composition is lowered, which is unpreferable. When the hydroxyl value of the polyester resin intermediate is more than about 20 mgKOH/g, the processibility of the coated film may be impaired, which is unpreferable. Accordingly, the polyester resin intermediate has the hydroxyl value of about 1 to 20 mgKOH/g.

When the glass transition temperature (Tg) of the acryl monomer is less than about 50° C., the film hardness deteriorates, which is unpreferable. When the glass transition temperature (Tg) of the acryl monomer is more than about 80° C., the adhesion between a topcoat film and an undercoat film is damaged resulting in lowering of the operation property, which is unpreferable. Hence, the acryl monomer preferably has the glass transition temperature of about 50° C. to 80° C.

When hydroxyl value of the acryl monomer is less than about 0.5% by weight or more than about 10% based on a total weight of the acryl monomer, a curing reaction of the paint composition occurs heterogeneously, which is unpreferable. Thus, the hydroxyl value of the acryl-modified polyester resin is preferably about 0.5 to 10% by weight.

Examples of the acryl monomer include acrylonitrile, acrylimide, diacetone acrylimide, methylacrylate, butylmethacrylate, laurylmethacrylate, acrylic acid, methylmethacrylate, ethylacrylate, butylacrylate, ethylmethacrylate, glycidyl methacrylate, 2-hydroxyethylmethacrylate, 2-hydroxyethylacrylate, hydroxypropylacrylate, etc. These can be used alone or in a mixture thereof. The acryl monomer undergoes a radical reaction at a temperature of about 80 to 140° C.

The acryl monomer improves the chemical resistance, hardness, gloss of the paint including the acryl-modified polyester resin composition, and also increases the compatibility with a solvent, thereby reducing the crystallization of the resin.

In order to produce the acryl-modified polyester resin composition, a polyhydric alcohol and a polybasic acid are condensed in a solvent to give the polyester resin. The polyester resin and an unsaturated polybasic acid are polymerized to give the polyester resin intermediate of formula (1) having the carbon-carbon double bond at one end. The polyester resin intermediate is then reacted with the acryl monomer.

$$R-CH_2-O-CO-CH=CH-X \quad (1)$$

wherein R represents a polyester polymer residue, and X represents a methyl or carboxylic group.

Examples of the solvent include an aromatic solvent having a high boiling point such as K-100 (the product of SK Corporation, Korea), K-150 (the product of SK Corporation, Korea), cyclohexanone, isophorone, etc. These can be used alone or in a mixture thereof.

Examples of the polyhydric alcohol include ethylene glycol, propylene glycol, 1,4-butylene glycol, 1,5-pentanediol, 1,6-hexanediol, neopentyl glycol, 2-methyl-1,3-propanediol, cyclohexane dimethanol, trimethylpentanediol, etc. These can be used alone or in a mixture thereof.

Examples of the polybasic acid include phthalic anhydrides, tetrahydrophthalic anhydrides, hexahydrophthalic anhydrides, isophthalic acid, terephthalic acid, adipic acid, azelaic acid, sebacic acid, cyclohexanediacid, etc. These can be used alone or in a mixture thereof.

When the content of the unsaturated polybasic acid is less than about 30% by equivalent weight based on the hydroxyl group of the polyester resin, compatibility is lowered during the subsequent acryl polymerization reaction, which is unpreferable. When the content of the unsaturated polybasic acid is more than about 100% by equivalent weight based on the hydroxyl group of the polyester resin, the chemical resistance and mechanical property of a coated film may be damaged by an isolated acid, which is unpreferable. Thus, the unsaturated polybasic acid is preferably used in a proportion of about 30 to 100% by equivalent weight.

Examples of the unsaturated polybasic acid include maleic acid, maleic anhydrides, fumaric acid, itaconic acid, itaconic anhydrides, etc. These can be used alone or in a mixture thereof.

During the production of the polyester resin intermediate, when the content of the polyester resin intermediate is less than about 30% by weight based on the resultant, the solid content in the final resin is too little, thereby damaging the dispersing operation property and stability of the paint, which is unpreferable. When the content of the polyester resin intermediate is more than about 80% by weight based on the resultant, the secondary acryl modification reaction becomes unstable due to high viscosity, and the operation property may be damaged, which is unpreferable. Thus, the content of the polyester resin intermediate is preferably from about 30 to 80% by weight based on the resultant.

The acryl-modified polyester resin composition is produced by the polymerization reaction of about 100 parts by weight of the polyester resin intermediate and about 5 to 100 parts by weight of the acryl monomer.

Preferably, the acryl monomer is provided together with a reaction initiator during the modification reaction.

Examples of the reaction initiator include isobutyl peroxide, tert-butylperoxyneodecanoate, octanonyl peroxide, benzoyl peroxide, acetyl peroxide, di-tert-butyl peroxide, azoisobutyronitrile, tert-butylperoxylaurate, etc. These can be used alone or in a mixture thereof.

During the polymerization of the polyester resin intermediate and the acryl monomer, when the content of the acryl monomer is less than about 5 parts by weight based on a total weight of the polyester resin intermediate, the modification reaction does not provide sufficient yields for a paint composition, which is unpreferable. When the content of the acryl monomer is more than about 100 parts by weight, the processibility of a coated film deteriorates, which is unpreferable. Thus, the acryl monomer is used about 5 to 100 parts by weight based on 100 parts by weight of the solid content of the polyester resin intermediate.

Hereinafter, the invention will be described more fully with reference to the following examples. The examples are given solely for the purpose of illustration and are not to be construed as limitations of the present invention, as many variations thereof are possible without departing from the spirit and scope of the invention.

EXAMPLE 1

Preparation of a Polyester Resin

A thermometer, a condenser, a stirrer, a water removing condenser, a heating device and a speed changing stirrer were connected to a 5-L four-neck flask. 855 g of neopentyl glycol, 410 g of 1,6-hexanediol, 975 g of isophthalic acid and 720 g of adipic acid were added to the flask. A condensation reaction was carried out in a xylene solvent with refluxing at 235° C. When an acid value is 10 mgKOH/g or less and a Gardener bubble viscosity is S to Y at 25° C., the flask was cooled down to 150° C. 1671 g of an aromatic solvent available from SK Corporation, Korea under the trade name of K-150 was added as a diluent in order to control the content of the polyester resin to be 60% by weight based on a total weight of the mixture including the solvent.

Preparation of a Polyester Resin Intermediate

A thermometer, a condenser, a stirrer, a water removing condenser, a heating device and a speed changing stirrer were connected to a 2-L four-neck flask. 1000 g of the obtained polyester resin, 20 g of maleic anhydride and 13 g of 2-ethoxy ethyl acetate were added to the flask. The reaction was carried out at 150° C. for 3 hours to give a polyester resin intermediate. The polyester resin intermediate has a Gardener bubble viscosity of X to Z2, and an acid value of 15 mgKOH/g. The content of the polyester resin intermediate was 60% by weight based on a total weight of the final mixture. The polyester resin intermediate has a carbon-carbon double bond at one end, a hydroxyl value of 13 mgKOH/g and an average molecular weight of 8600.

Preparation of an Acryl-Modified Polyester Resin Composition

A mixture of 60 g of styrene, 48 g of methyl methacrylate, 12 g of butyl acrylate, 3 g of benzoyl peroxide and 82 g of an aromatic solvent available from SK Corporation, Korea under the trade name of K-150 were added dropwise to 1000 g of the polyester resin intermediate at 140° C. for 3 hours. The reaction was carried out at 150° C. for 8 hours to give an acryl-modified polyester resin composition having a Gardener bubble viscosity of X to Z2. The content of the acryl-modified polyester resin composition is 60% by weight based on a total weight of the reactants.

EXAMPLE 2

Preparation of a Polyester Resin

A thermometer, a condenser, a stirrer, a water removing condenser, a heating device and a speed changing stirrer were connected to a 5-L four-neck flask. 855 g of neopentyl glycol, 410 g of 1,6-hexanediol, 975 g of isophthalic acid and 720 g of adipic acid were added to the flask. A condensation reaction was carried out in a xylene solvent with refluxing at 235° C. When an acid value is 10 mgKOH/g or less and a Gardener bubble viscosity is S to Y at 25° C., the flask was cooled down to 150° C. 1671 g of an aromatic solvent available from SK Corporation, Korea under the trade name of K-150 was added as a diluent in order to control the content of the polyester resin to be 60% by weight based on a total weight of the mixture including the solvent.

Preparation of a Polyester Resin Intermediate

A thermometer, a condenser, a stirrer, a water removing condenser, a heating device and a speed changing stirrer were connected to a 2-L four-neck flask. 1000 g of the obtained polyester resin, 20 g of maleic anhydride and 13 g of 2-ethoxy ethyl acetate were added to the flask. The reaction was carried out at 150° C. for 3 hours to give a polyester resin intermediate. The polyester resin intermediate has a Gardener bubble viscosity of X to Z2, and an acid value of 15 mgKOH/g. The content of the polyester resin intermediate was 60% by weight based on a total weight of the final mixture. The polyester resin intermediate has a carbon-carbon double bond at one end, a hydroxyl value of 13 mgKOH/g and an average molecular weight of 8600.

Preparation of an Acryl-Modified Polyester Resin Composition

A mixture of 45 g of styrene, 50 g of methyl methacrylate, 10 g of butyl acrylate, 15 g of hydroxyethyl methacrylate, 3 g of benzoyl peroxide and 82 g of an aromatic solvent available from SK Corporation, Korea under the trade name of K-150 were added dropwise to 1000 g of the polyester resin intermediate at 140° C. for 3 hours. The reaction was carried out at 150° C. for 8 hours to give an acryl-modified polyester resin composition having a Gardener bubble viscosity of X to Z2. The content of the acryl-modified polyester resin composition is 60% by weight based on a total weight of the reactants.

EXAMPLE 3

Preparation of a Polyester Resin

A thermometer, a condenser, a stirrer, a water removing condenser, a heating device and a speed changing stirrer were connected to a 5-L four-neck flask. 1303 g of neopentyl glycol, 76 g of trimethylolpropane, 1050 g of isophthalic acid, 235 g of adipic acid and 600 g of phthalic anhydride were added to the flask. A condensation reaction was carried out in a xylene solvent with refluxing at 235° C. to obtain a polyester resin. The polyester resin has an acid value of 5 mgKOH/g and a Gardener bubble viscosity of T to Z at 25° C. The content of the polyester resin is 60% by weight based on a total weight of the mixture including the solvent.

Preparation of a Polyester Resin Intermediate

To a 2-L four-neck flask, 1000 g of the obtained polyester resin, 27 g of maleic anhydride and 18 g of 2-ethoxy ethyl acetate were added. The reaction was carried out at 150° C. for 3 hours to give a polyester resin intermediate. The polyester resin intermediate has a Gardener bubble viscosity of X to Z2, and an acid value of 20 mgKOH/g. The content of the polyester resin intermediate was 60% by weight based on a total weight of the mixture. The polyester resin intermediate has a carbon-carbon double bond at one end, a hydroxyl value of 18 mgKOH/g and an average molecular weight of 8500.

Preparation of an Acryl-Modified Polyester Resin Composition

A mixture of 72 g of styrene, 58 g of methyl methacrylate, 20 g of butyl acrylate, 4 g of benzoyl peroxide and 103 g of an aromatic solvent available from SK Corporation, Korea under the trade name of K-150 were added dropwise to 1000 g of the polyester resin intermediate at 140° C. for 3 hours. The reaction was carried out at 150° C. for 8 hours to give an acryl-modified polyester resin composition having a Gardener bubble viscosity of X to Z3. The content of the acryl-modified polyester resin composition was 60% by weight based on a total weight of the mixture.

EXAMPLE 4

Preparation of a Polyester Resin

A thermometer, a condenser, a stirrer, a water removing condenser, a heating device and a speed changing stirrer were connected to a 5-L four-neck flask. 1303 g of neopentyl glycol, 76 g of trimethylolpropane, 1050 g of isophthalic acid, 235 g of adipic acid and 600 g of phthalic anhydride were added to the flask. A condensation reaction was carried out in a xylene solvent with refluxing at 235° C. to obtain a polyester resin. The polyester resin has an acid value of 5 mgKOH/g and a Gardener bubble viscosity of T to Z at 25° C. The content of the polyester resin was 60% by weight based on a total weight of the mixture including the solvent.

Preparation of a Polyester Resin Intermediate

To a 2-L four-neck flask, 1000 g of the obtained polyester resin, 27 g of maleic anhydride and 18 g of 2-ethoxy ethyl acetate were added. The reaction was carried out at 150° C. for 3 hours to give a polyester resin intermediate. The polyester resin intermediate has a Gardener bubble viscosity of X to Z2, and an acid value of 20 mgKOH/g. The content of the polyester resin intermediate was 60% by weight based on a total weight of the mixture. The polyester resin intermediate has a carbon-carbon double bond at one end, a hydroxyl value of 18 mgKOH/g and an average molecular weight of 8500.

Preparation of an Acryl-Modified Polyester Resin Composition

A mixture of 50 g of styrene, 50 g of methyl methacrylate, 10 g of butyl acrylate, 10 g of hydroxypropylacrylate, 3 g of benzoyl peroxide, and 82 g of an aromatic solvent available from SK Corporation, Korea under the trade name of K-150 were added dropwise to 1000 g of the polyester resin intermediate dropwise at 140° C. for 3 hours. The reaction was carried out at 150° C. for 8 hours to give an acryl-modified polyester resin composition having a Gardener bubble viscosity of Y to Z2. The content of the acryl-modified polyester resin composition was 60% by weight based on a total weight of the mixture.

COMPARATIVE EXAMPLE 1

A thermometer, a condenser, a stirrer, a water removing condenser, a heating device and a speed changing stirrer were connected to a 5-L four-neck flask. 825 g of neopentyl glycol, 510 g of 1,6-hexanediol, 1745 g of isophthalic acid and 205 g of adipic acid were added to the flask. A condensation reaction was carried out in a xylene solvent with refluxing at 235° C. to give a polyester resin having a Gardener bubble viscosity of Z to Z3. The content of the acryl-modified polyester resin composition was 60% by weight based on a total weight of the mixture. The polyester resin has an acid value of 18 mgKOH/g and a average molecular weight of 12600.

Experiment 1

500 g of the acryl-modified polyester resin composition obtained in Example 1 was mixed with 200 g of titanium dioxide. The mixture was sprayed using a mini motor mill to control the particle size to be seven. 30 g of hexamethylene methoxy melamine, 150 g of an aromatic solvent commercially available from SK Corporation, Korea under the trade name of K-150, 100 g of 2-ethoxyethylacetate and 1 g of p-toluenesulfonic acid as a catalyst were added to give a paint composition.

Experiment 2

500 g of the acryl-modified polyester resin composition obtained in Example 2 was mixed with 200 g of titanium dioxide. The mixture was sprayed using a mini motor mill to control the particle size to be seven. 30 g of hexamethylenemethoxy melamine, 150 g of an aromatic solvent commercially available from SK Corporation, Korea under the trade name of K-150, 100 g of 2-ethoxyethylacetate and 1 g of p-toluenesulfonic acid as a catalyst were added to give a paint composition.

Experiment 3

500 g of the acryl-modified polyester resin composition obtained in Example 3 was mixed with 200 g of titanium dioxide. The mixture was sprayed using a mini motor mill to control the particle size to be seven. 30 g of hexamethylene methoxy melamine, 150 g of an aromatic solvent commercially available from SK Corporation, Korea under the trade name of K-150, 100 g of 2-ethoxyethylacetate and 1 g of p-toluenesulfonic acid as a catalyst were added to give a paint composition.

Experiment 4

500 g of the acryl-modified polyester resin composition obtained in Example 4 was mixed with 200 g of titanium dioxide. The mixture was sprayed using a mini motor mill to control the particle size to be seven. 30 g of hexamethylene methoxy melamine, 150 g of an aromatic solvent commercially available from SK Corporation, Korea under the trade name of K-150, 100 g of 2-ethoxyethylacetate and 1 g of p-toluenesulfonic acid as a catalyst were added to give a paint composition.

Comparative Experiment 1

500 g of the acryl-modified polyester resin composition obtained in Comparative example 4 was mixed with 200 g of titanium dioxide. The mixture was sprayed using a mini motor mill to control the particle size to be seven. 30 g of hexamethylene methoxy melamine, 150 g of an aromatic solvent commercially available from SK Corporation, Korea under the trade name of K-150, 100 g of 2-ethoxyethylacetate and 1 g of p-toluenesulfonic acid as a catalyst were added to give a paint composition Paint Performance Test Steel sheets treated with a zinc phosphoric acid were used as substrates. Each substrate was undercoated and then topcoated with each of the paints obtained in Experiments 1 to 4 and Comparative Experiment 1. The thickness of the topcoat film was 15± 2 μm, and the surface temperature of the substrate was 232± 5° C., respectively.

1. Gloss

The gloss was tested according to American Society for Testing and Materials D-523 (ASTM-D-523) that measures the gloss of a non-metal.

2. MEK Rubbing Property

Methyl ethyl ketone rubbing property was test according to National Coil Coaters Association II-18 (NCCA-II-18) that evaluates the solvent resistance.

3. Processibility

The processibility was tested according to NCCA-II-19 'T' band test.

4. Pencil Hardness

The pencil hardness was tested according to NCCA-II-12 that evaluates relative pencil hardness.

5. C.E.T.

The C.E.T. was tested according to NCCA-II-20 that evaluates the adhesiveness of the substrate.

6. Acid Resistance and Alkali Resistance

The acid resistance and alkali resistance were tested according to ASTM-D-1308 that is an international standard for chemicals used for finishing materials of organic matters.

7. Boiling Water Resistance

Substrate having a film formed thereon was dipped into boiling water for 24 hours. Changes of the coated film were observed with naked eyes.

8. Distinctiveness of Image

Calibrated scales were distinguished using PDG METER.

9. Adhesiveness

The coated film was scratched by constant power using a coin. The amount of film detached from the substrate or topcoat film was observed with naked eyes.

10. Storage Property 500 g of the resin and 500 g of the paint were added to a 500 ml beaker, respectively. The beaker was sealed for one month at 5° C. For the resin, color change of the resin, and film dissociation due to lowered compatibility with the solvent were observed. For the paint, dissociation with the pigment, dissociation with the solvent, color coagulation and color separation were observed with naked eyes.

Referring to Table 1, the films that were coated using the paint compositions obtained in Experiments 1 to 4 have improved alkali resistance and storage property of the resin and paint than the paint composition obtained in Comparative Experiment 1. Since the processibility and the pencil hardness are opposite properties, the paint composition obtained in comparative example 1 shows excellent processibility, but poor pencil hardness. Each of the paints obtained in Experiments 1 to 4 shows excellent processibility and excellent hardness. The coated films using the paints of Experiments 1 to 4 show better appearance than that of comparative Experiment 1. In adhesion between the topcoat film and the undercoat film, paints of Experiments 1 to 4 and Comparative Experiment 1 show good results. Particularly, the paints of Experiments 1 and 3 show excellent results.

As described above, the polyester resin intermediate having a polyester resin at the ends and an acryl monomer are copolymerized to give an acryl-modified polyester resin composition.

The paints including the acryl-modified polyester resin composition give an excellent mechanical property, chemical resistance, compatibility with solvent, storage property of the resin and paint, gloss, distinctiveness of image and appearance of a coated film.

The paints have improved physical and chemical properties for coating the PCM steel sheet of home appliances. Additionally, the paints provide a stable coated film.

What is claimed is:

1. An acryl-modified polyester resin composition for coating a pre-coated metal steel sheet, comprising:
    an acryl-modified polyester resin produced by a polymerization of a polyester resin intermediate of formula (1) and an acryl monomer:

$$R-CH_2-O-CO-CH=CH-X \quad (1)$$

TABLE 1

| Paint composition | Experiment 1 | Experiment 2 | Experiment 3 | Experiment 4 | Comparative Experiment 1 |
| --- | --- | --- | --- | --- | --- |
| Gloss(60°) | 90 | 88 | 92 | 90 | 88 |
| distinctiveness of image | 0.90 | 0.88 | 0.92 | 0.90 | 0.67 |
| MEK Rubbing | 100≧ | 100≧ | 100≧ | 100≧ | 100≧ |
| Processibility | 0T | 1T | 0T | 1T | 0T |
| pencil hardness | F | F | F | H | B |
| C.E.T | 100/100 | 100/100 | 100/100 | 100/100 | 100/100 |
| acid resistance | good | good | good | good | good |
| alkali resistance | good | good | good | good | Bad |
| boiling water resistance | good | good | good | good | good |
| storage property of resin | good | good | good | good | suspended a bit |
| storage property of paint | good | good | good | good | precipitation |
| appearance of coated film | ◉ | ◉ | ◉ | ◉ | Δ |
| adhesion between the topcoat film and the undercoat film | ◉ | 0 | ◉ | 0 | 0 |

In TABLE 1, '◉' represents excellent, '0' represents good, and 'Δ' represents ordinary.

wherein R represents a polyester polymer residue, and X represents a methyl or carboxylic group, and wherein the polyester resin intermediate has a hydroxyl value of about 1 to 20 mgKOH/g and an acid value of 15 to 30 mgKOH/g; and a solvent comprising cyclohexanone, isophorone, or a combination thereof, wherein the acryl-modified polyester resin composition has a Gardener bubble viscosity of X to Z3 and a paint film comprising the acryl-modified polyester resin composition has a pencil hardness of H or harder according to NCCA-II-12.

2. The composition of claim 1, wherein the polyester resin intermediate has an average molecular weight of about 1500 to 15000.

3. The composition of claim 1, wherein the acryl monomer is at least one selected from the group consisting of acrylonitrile, acrylimide, diacetone acrylimide, methylacrylate, butylmethacrylate, laurylmethacrylate, acrylic acid, methylmethacrylate, ethylacrylate, butylacrylate, ethylmethacrylate, glycidyl methacrylate, 2-hydroxyethylmethacrylate, 2-hydroxyethylacrylate and hydroxypropylacrylate.

4. The composition of claim 1, wherein the acryl monomer undergoes a radical reaction at a temperature of about 80 to 140° C.

5. A method of preparing an acryl-modified polyester resin composition for coating a pre-coated metal steel sheet, comprising:
i) condensing a polyhydric alcohol and a polybasic acid in a solvent to give a polyester resin;
ii) polymerizing the polyester resin and an unsaturated polybasic acid to give a polyester resin intermediate of formula (1) having a carbon-carbon double bond at one end,

R—CH$_2$—O—CO—CH=CH—X  (1)

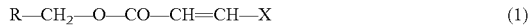

wherein R represents a polyester polymer residue, and X represents a methyl or carboxylic group; and
iii) polymerizing the polyester resin intermediate and an acryl monomer in the presence of a solvent comprising cyclohexanone, isophorone, or a combination thereof to give the acryl-modified polyester resin composition, wherein the polyester resin intermediate has a hydroxyl value of about 1 to 20 mgKOH/g and an acid value of 15 to 30 mgKOH/g, and wherein the acryl-modified polyester resin composition has a Gardener bubble viscosity of X to Z3 and a paint film comprising the acryl-modified polyester resin composition has a pencil hardness of H or harder according to NCCA-II-12.

6. The method of claim 5, wherein the polyester resin intermediate has a average molecular weight of about 1500 to 15000, and wherein a content of the polyester resin intermediate is about 30 to 80% by weight based on a total weight of a resultant of step ii).

7. The method of claim 5, wherein the polyester resin intermediate and the acryl monomer are polymerized by adding the acryl monomer together with an initiator at least one selected from the group consisting of isobutyl peroxide, tertbutylperoxyneodecanoate, octanonyl peroxide, benzoyl peroxide, acetyl peroxide, ditert-butyl peroxide, azoisobutyronitrile and tert-butylperoxylaurate.

8. The method of claim 5, wherein the polyester resin intermediate and the acryl monomer are polymerized by copolymerizing about 100 parts by weight of the polyester resin intermediate and about 5 to 100 parts by weight of the acryl monomer.

9. The method of claim 5, wherein the polyhydric alcohol is at least one selected from the group consisting of ethylene glycol, propylene glycol, 1,4-butylene glycol, 1,5-pentanediol, 1,6-hexanediol, neopentyl glycol, methyl propanediol, cyclohexane dimethanol and trimethylpentanediol, wherein the polybasic acid is at least one selected from the group consisting of phthalic anhydrides, tetrahydrophthalic anhydrides, hexahydrophthalic anhydrides, isophthalic acid, terephthalic acid, adipic acid, azelaic acid, sebacic acid and cyclohexanediacid, and wherein the unsaturated polybasic acid alcohol is at least one selected from the group consisting of maleic acid, maleic anhydrides, fumaric acid, itaconic acid and itaconic anhydrides.

10. The composition of claim 1, wherein the acryl-modified polyester resin composition is produced by a polymerization of the polyester resin intermediate, the acryl monomer and styrene.

* * * * *